United States Patent [19]

Saperstein

[11] Patent Number: 4,529,034
[45] Date of Patent: Jul. 16, 1985

[54] HEAT EXCHANGER HAVING A HEADER PLATE

[75] Inventor: Zalman P. Saperstein, Racine, Wis.

[73] Assignee: Modine Manufacturing Company, Racine, Wis.

[21] Appl. No.: 287,217

[22] Filed: Jul. 27, 1981

Related U.S. Application Data

[63] Continuation of Ser. No. 105,626, Dec. 20, 1979, abandoned.

[51] Int. Cl.³ .............................................. F28F 9/16
[52] U.S. Cl. ............................... 165/134 R; 29/157.4; 165/173; 165/175; 165/178; 285/189; 285/286; 285/287
[58] Field of Search ......... 165/173, 175, 178, DIG. 9, 165/134 R; 285/137 R, 189, 286, 287; 29/157.4

[56] References Cited

U.S. PATENT DOCUMENTS

| | | | |
|---|---|---|---|
| 2,886,881 | 5/1959 | Huet | 285/381 |
| 3,027,142 | 3/1962 | Albers et al. | 165/DIG. 9 |
| 3,229,760 | 1/1966 | Hurter et al. | 165/134 R |
| 3,245,465 | 4/1966 | Young | 165/173 X |
| 3,266,567 | 8/1966 | Oddy et al. | 165/151 |
| 3,472,316 | 10/1969 | Couch, Jr. | 165/175 X |
| 3,496,629 | 2/1970 | Martucci et al. | 29/157.4 X |
| 3,787,945 | 1/1974 | Pasek et al. | 165/175 X |
| 4,066,861 | 1/1978 | Broodman | 165/173 X |
| 4,221,263 | 9/1980 | Meyer | 165/173 |
| 4,305,459 | 12/1981 | Nonnenmann et al. | 165/173 |

FOREIGN PATENT DOCUMENTS

| | | | |
|---|---|---|---|
| 1544006 | 10/1968 | France. | |
| 890896 | 3/1962 | United Kingdom. | |
| 1332777 | 10/1973 | United Kingdom | 29/157.4 |
| 1445598 | 8/1976 | United Kingdom. | |
| 422936 | 9/1974 | U.S.S.R.. | |

Primary Examiner—Sheldon J. Richter
Attorney, Agent, or Firm—Wood, Dalton, Phillips, Mason & Rowe

[57] ABSTRACT

A fluid-to-fluid such as a liquid-to-air heat exchanger and a method of making such a heat exchanger in which there is provided a header plate, a plurality of liquid coolant tubes each extending into a hole in the header plate, a primary load bearing joint subject to the formation of leakage openings in the joint joining each tube to the header plate at its tube opening, and a thin sealant sealing against leakage any leakage openings that may be present or that may occur.

6 Claims, 3 Drawing Figures

HEAT EXCHANGER HAVING A HEADER PLATE

This is a continuation of application Ser. No. 105,626 filed Dec. 20, 1979, now abandoned.

BACKGROUND OF THE INVENTION

In heat exchangers of the type considered herein there is usually provided a pair of spaced header plates between which extend spaced tubes for conveying a first fluid such as a liquid between spaced tanks of which the header plates are parts. A second fluid such as air is then forced over and between the tubes and usually in contact with serpentine fins for cooling the liquid flowing through the tubes. An automotive radiator is a good example of such an exemplary heat exchanger.

Many of these heat exchangers particularly where the headers and tubes are constructed of brass and the interconnecting fins of copper are deficient in strength because the joints are customarily solder and have poor creep and fatigue properties. This invention both in structure and method avoids these difficulties by providing a primary load bearing joint such as weld metal joining the tubes to the headers at their areas of contact or of close proximity and then a thin sealant sealing against leakage any small leakage openings such as cracks, fissures, pin holes or the like that may be present.

The most pertinent prior art of which I am aware are the following U.S. Pat. Nos. 2,270,864; 2,914,346; 3,078,551; 3,349,464; 3,496,629; 3,633,660; 3,689,941; 3,710,473; 3,750,747 and 3,763,536. Although many of these patents illustrate the problems of cracks, fissures and similar leaks in welded joints, none of them teach the solution to this problem of providing in the heat exchanger combination a thin sealant.

DESCRIPTION OF THE PREFERRED EMBODIMENT

Figure 1:
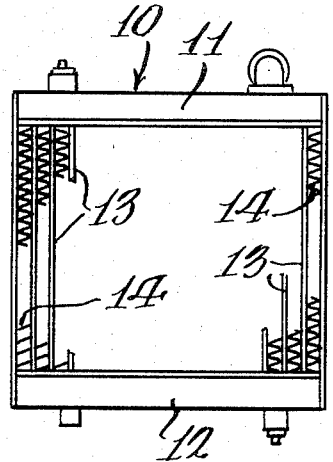
FIG. 1 is a plan view of an automotive radiator embodying the invention.

The fluid-to-fluid heat exchanger, embodied in the radiator 10 as illustrated in FIG. 1, comprises an upper tank 11, a lower tank 12 spaced therefrom, spaced tubes 13 of oval or flattened cross section spaced from each other with adjacent tubes being interconnected by serpentine fins 14 having their crests 15 attached to the tubes 13 in the customary manner as by welding, brazing, soldering or the like.

Figure 2:
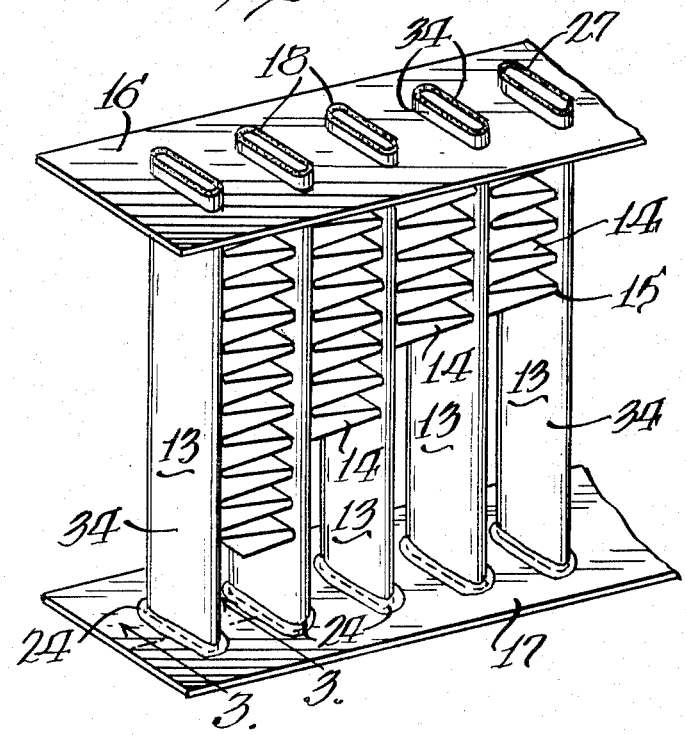
FIG. 2 is a fragmentary partial perspective view of the elements of the radiator of FIG. 1.
Figure 3:
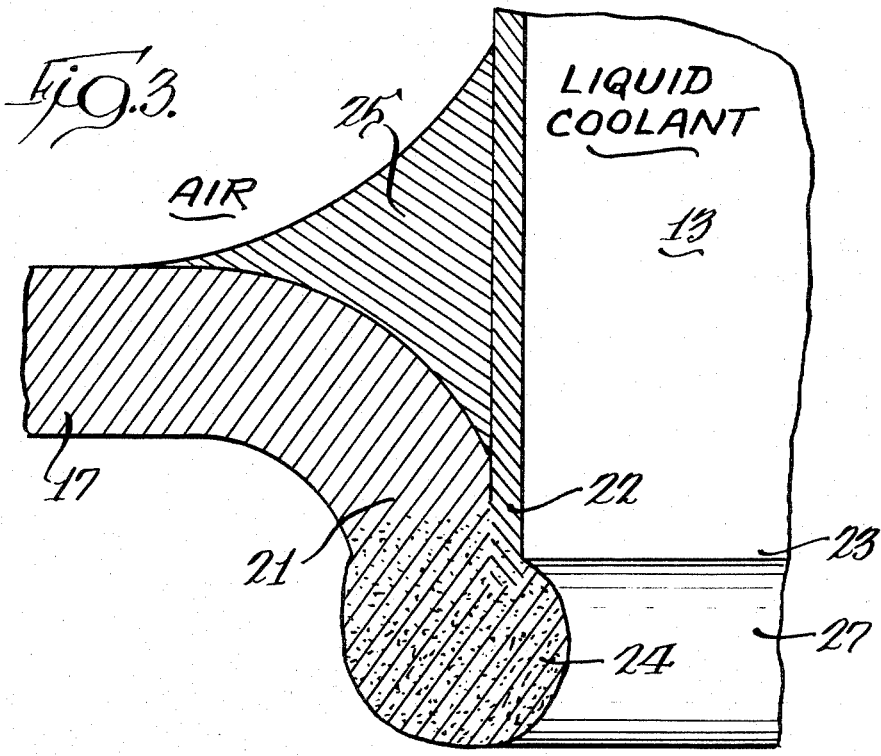
FIG. 3 is an enlarged fragmentary sectional view taken substantially along line 3—3 of FIG. 2.

The tanks 11 and 12 have as component parts upper 16 and lower 17 header plates through which the tube ends 18 extend as shown in relation to the upper plate 16 of FIG. 2. The plates 16 and 17 each are provided with an outwardly extending flange as illustrated at 21 in FIG. 3 as a part of the lower plate 17. These flanges 21 describe a hole 22 into which the tube end 23 extends.

This tube end 23 is attached to the plate flange 21 by a primary load bearing joint 24. This joint is in two parts with the first part being the welded joint 24 and the second part being a solder coating 25 on the air side between the tube 13 and flange 21.

Where the heat exchanger is constructed of metal the load bearing joint 24 is preferably of welded construction. The term "weld" is used in its broadest sense and is usually formed with metal parts by heating and allowing metals to flow together. Where the parts are of plastic, and this heat exchanger can be constructed of strong plastic parts, these parts are united in a similar manner by heating to form the weld.

After the primary load bearing joint 24 is formed there is added the second part of the joint: the solder coating or layer 25 completely covering the outer surface side of joint 24. This outer surface side is shown generally at 35 in FIG. 3.

The main part of the load between the headers 16 and 17 and the tubes 13 is taken up by the primary load bearing joint 24. The sealant 25, particularly where it is solder or brazing on a welded joint, also has a load bearing function. However, its main purpose is to seal up and close leakage openings such as fissures, cracks, pin points and the like that occur either during the manufacturing process or in subsequent use. In any event, although the primary purpose of the sealant 25 is to prevent immediate or after developed leakage problems, it does function to distribute some of the forces between the tubes 13 and the header plates 16 and 17 and particularly those caused by internal pressure and temperature changes of the liquid on the interior 33 of the tubes.

With the usual flattened tubes 13 of the customary automotive radiator, and especially when these tubes comprise brass, internal pressure changes of the coolant, normally water, within the tubes causes the sides 34 of the tubes to tend to expand away from each other under internal pressure and contract back toward each other to the position shown in FIG. 2, for example, under these internal pressure as well as temperature changes. The primary joint 24 successfully absorbs these loads caused by pressure and temperature expansion and contraction.

Although this invention is most useful in conjunction with heat exchangers made of metal parts, it is also useful in heat exchangers made of reinforced plastic; and these are coming into increasing use. Whether of plastic or metal, the joint 24 is a primary load bearing joint. The sealant 25 in all these embodiments functions mainly as a sealant but is also, secondarily, a load distributing member.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A radiator for a vehicle for exchanging heat between a liquid engine coolant and air, comprising:
   a header plate having an inner surface exposed to said liquid coolant and an outer surface exposed to said air, said plate containing a plurality of spaced tube receiving holes each surrounded by a peripheral flange on said inner surface;
   a plurality of liquid coolant receiving tubes, with each said tube extending into a separate said hole;
   brazed or welded load bearing joints at said inner surface joining at least some or all of said tubes to said plate at the flanges about said holes and exposed to said liquid at said inner surface, said load bearing joints being subject to the formation of leakage openings therein; and a continuous, solid sealant coating on said plate at said holes on said outer surface completely covering the outer surface side of said load bearing joints and thereby sealing said load bearing joints against any leakage through any leakage openings;

said load bearing joints comprising weld metal and said sealant coating comprising solder.

2. A radiator for a vehicle for exchanging heat between a liquid engine coolant and air, comprising:

a header plate having an inner surface exposed to said liquid coolant and an outer surface exposed to said air, said plate containing a plurality of spaced tube receiving holes each surrounded by a peripheral flange on said inner surface;

a plurality of liquid coolant receiving tubes, with each said tube extending into a separate said hole;

brazed or welded load bearing joints at said inner surface joining at least some or all of said tubes to said plate at the flanges about said holes and exposed to said liquid at said inner surface, said load bearing joints being subject to the formation of leakage openings therein; and a continuous, solid sealant coating on said plate at said holes on said outer surface completely covering the outer surface side of said load bearing joints and thereby sealing said load bearing joints against any leakage through any leakage openings;

said load bearing joints comprising brazing metal and said sealant coating comprising solder.

3. A radiator for a vehicle including upper and lower tanks, each of said tanks having a header plate provided with a series of tube holes, the header plates being in facing but spaced relation and each having opposed sides, a first of said sides being within the associated tank and having flanges surrounding said tube holes, and the second of said sides being relatively flat, a plurality of tubes extending in generally parallel relation between said header plates and having opposed ends disposed in respective ones of said tube holes in respective ones of said header plates, both ends of at least some or all of said tubes being welded about their periphery to the adjacent one of the flanges on said header plates on said first side thereof to thereby form bonded primary load bearing joints which are nominally sealed but are subject to the formation of leakage openings, and a thin solid sealant coating on the second sides of both said header plates opposite said first sides and completely covering said joints oppositely of said welded ends thereby sealing said joints against leakage through any of said leakage openings that might exist.

4. A radiator for a vehicle including two spaced engine coolant receiving tanks, each of said tanks having a header plate provided with a series of tube holes each surrounded by flanges only on the side of the associated plate within the tank, the header plates being in facing but spaced relation and each having a coolant contacting surface within the associated tank and an opposed air contacting surface, a plurality of tubes extending in generally parallel relation between said header plates and having opposed ends disposed in respective ones of said tube holes in respective ones of said header plates, both ends of at least some or all of said tubes being welded or brazed to the flanges on the adjacent one of said header plates at said coolant contacting surface to thereby form bonded primary load bearing joints which are subject to the formation of leakage openings, and a solid sealant coating on the air contacting surface of both said header plates completely covering said joints oppositely of said brazed or welded ends thereby sealing said joints against leakage through any of said leakage openings that might exist.

5. A radiator for a vehicle having an engine and including a pair of spaced engine coolant receiving tanks, each of said tanks having a header plate provided with a series of tube holes extending through the respective plate from an air side thereof to an opposed coolant side thereof within the associated tank, each of said tube holes, on said coolant side, being provided with a substantially peripherally extending flange directed into the associated tank, said header plates being in facing but spaced relation, a plurality of open ended tubes extending in generally parallel relation between said header plates and having opposed ends disposed in respective ones of said tube holes in respective ones of said header plates, both ends of at least some or all of said tubes being welded or brazed to the flange of the tube holes in which they are received on said liquid side of the corresponding header plate to thereby form primary load bearing joints which are nominally sealed but are subject to the formation of leakage openings, and a solid sealant solder coating on the air side of both said header plates completely covering said primary load bearing joints opposite of said brazed or welded ends thereby sealing said joints against leakage through any of said leakage openings that might exist.

6. The radiator of claim 5 wherein said both ends of all of said tubes are welded or brazed.

* * * * *